Aug. 21, 1962 C. TANNINI 3,049,960
COMBINED PIANO AND ACCORDION INSTRUMENT
Filed July 30, 1959 15 Sheets-Sheet 1

INVENTOR.
CAMILLO TANNINI
BY
Carl Miller
ATTORNEY

Aug. 21, 1962  C. TANNINI  3,049,960
COMBINED PIANO AND ACCORDION INSTRUMENT
Filed July 30, 1959  15 Sheets-Sheet 2
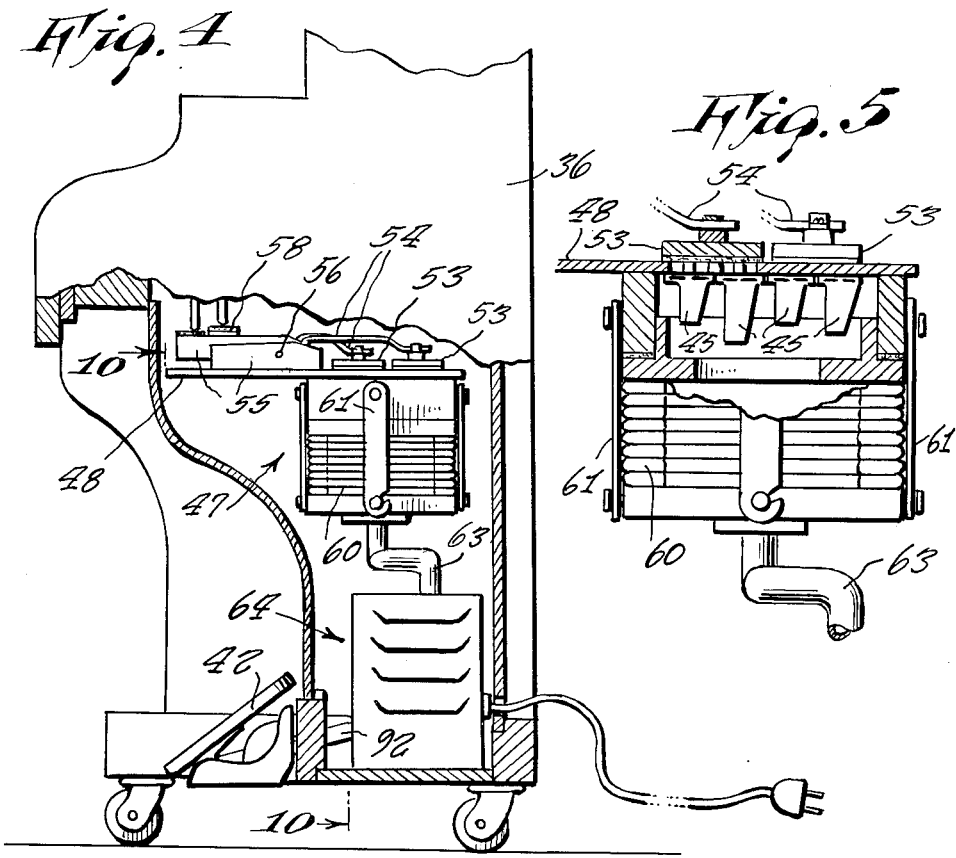
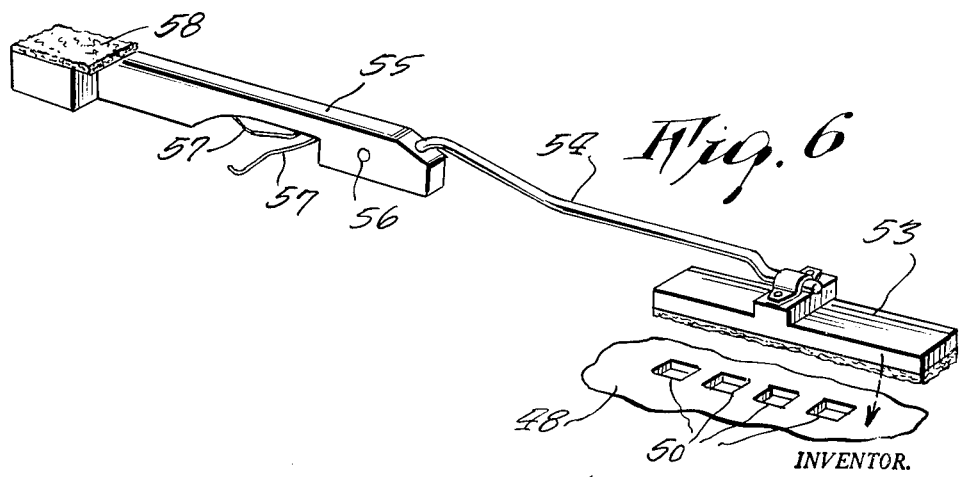
INVENTOR.
CAMILLO TANNINI
BY
Carl Miller
ATTORNEY

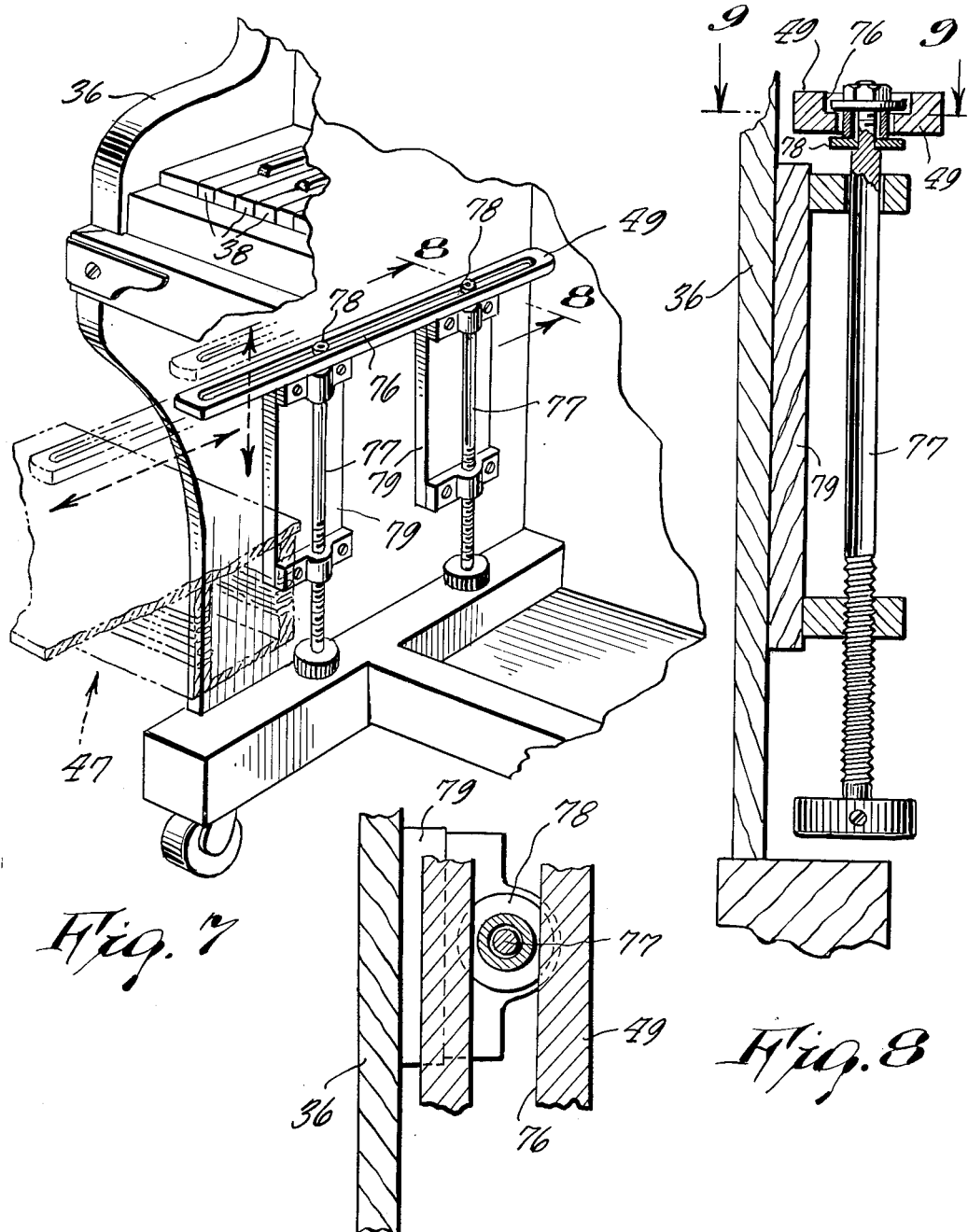

Aug. 21, 1962 C. TANNINI 3,049,960
COMBINED PIANO AND ACCORDION INSTRUMENT
Filed July 30, 1959 15 Sheets-Sheet 4
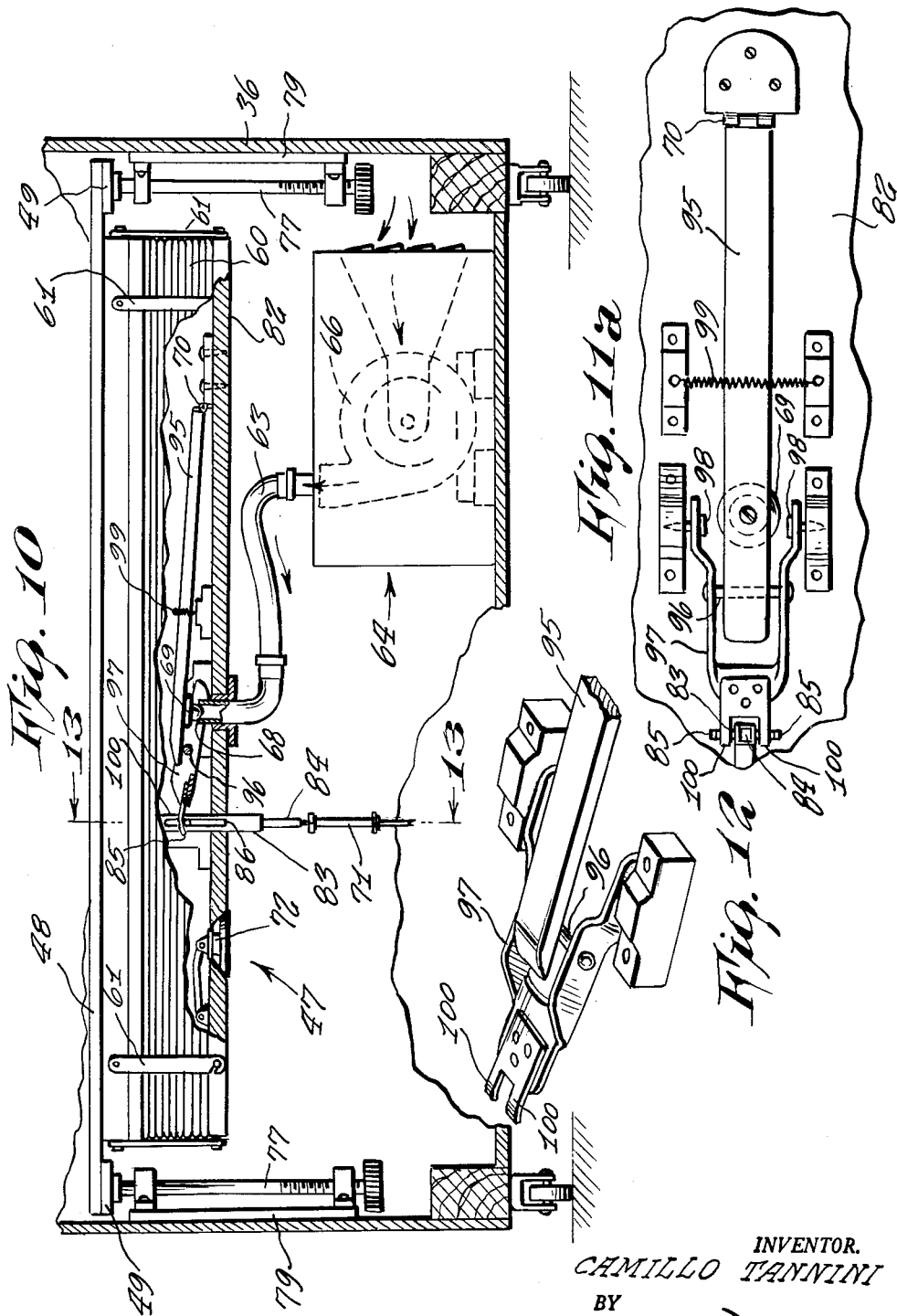
INVENTOR.
CAMILLO TANNINI
BY
Carl Miller
ATTORNEY

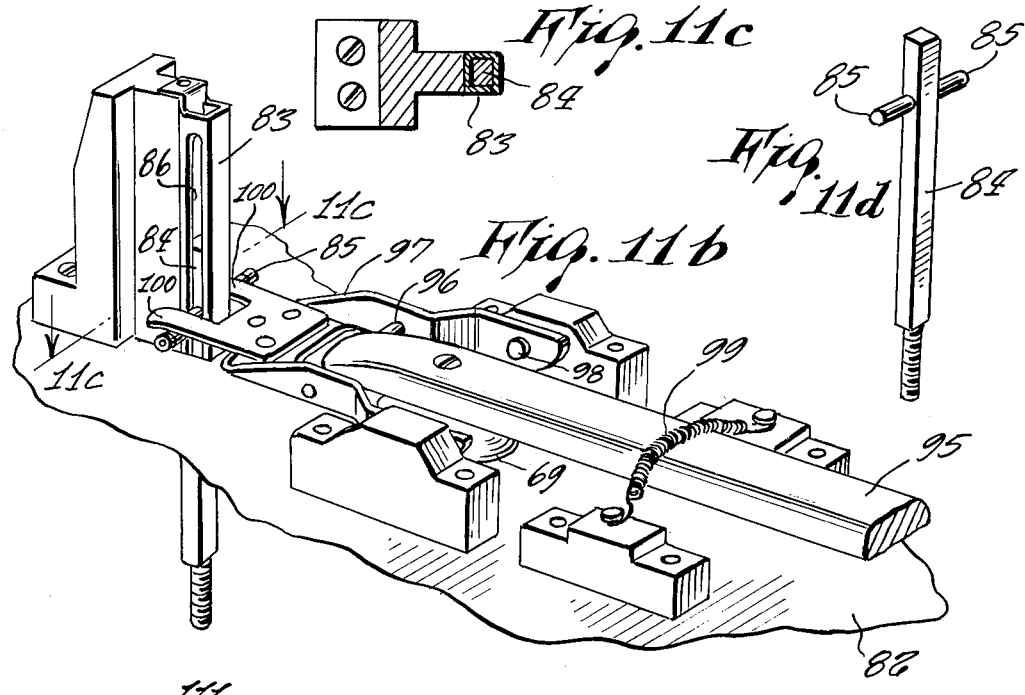
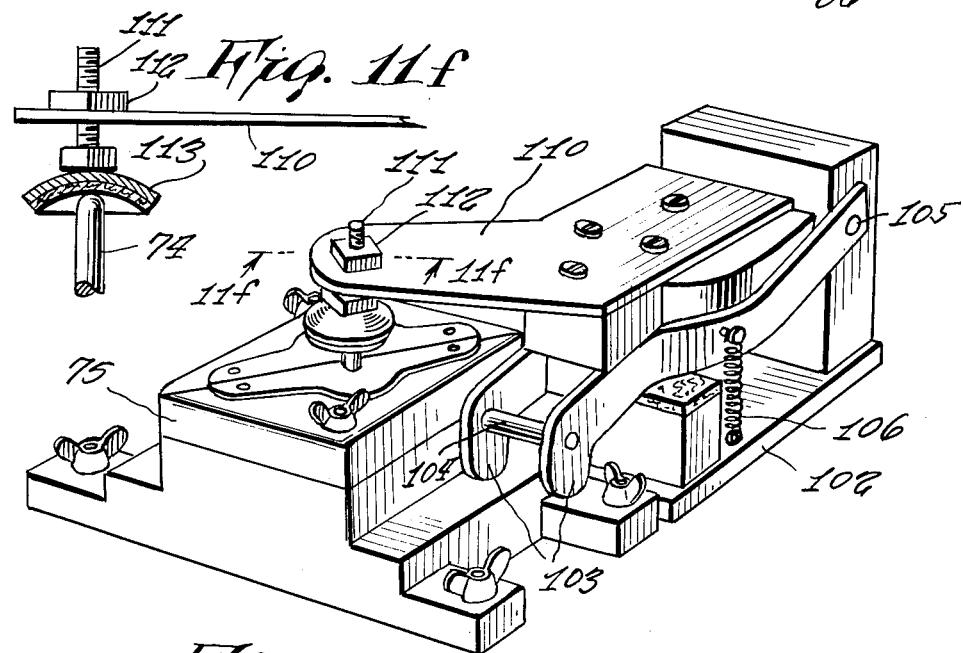

Aug. 21, 1962 C. TANNINI 3,049,960
COMBINED PIANO AND ACCORDION INSTRUMENT
Filed July 30, 1959 15 Sheets-Sheet 6
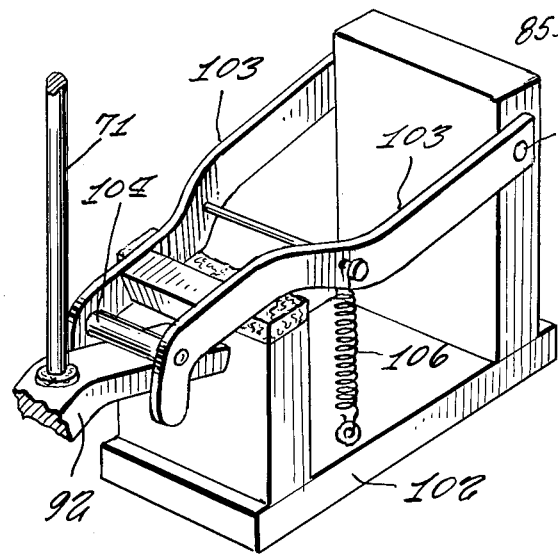
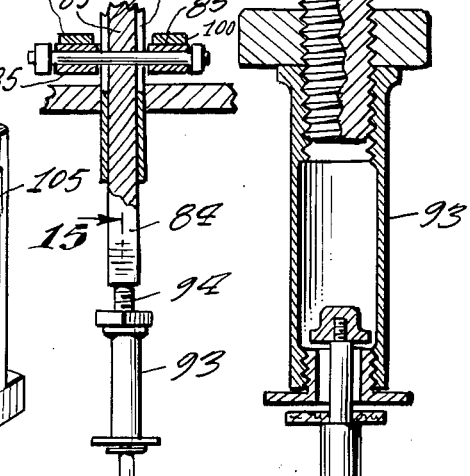
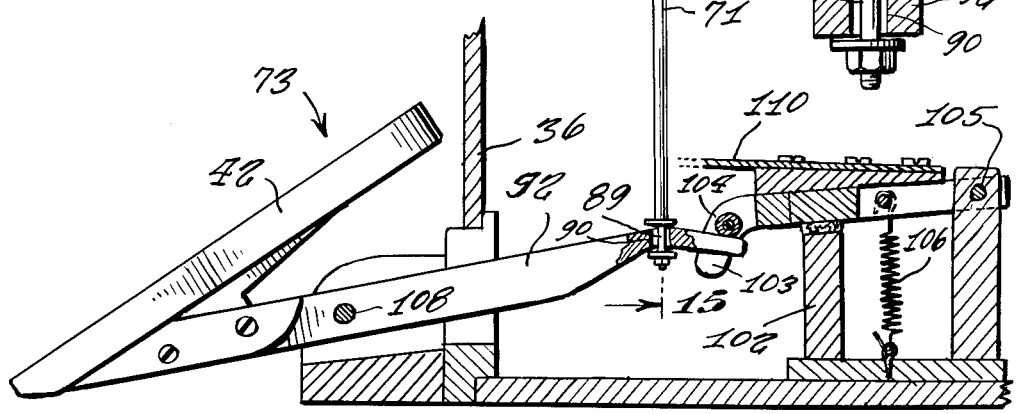
INVENTOR.
CAMILLO TANNINI
BY
Carl Miller
ATTORNEY

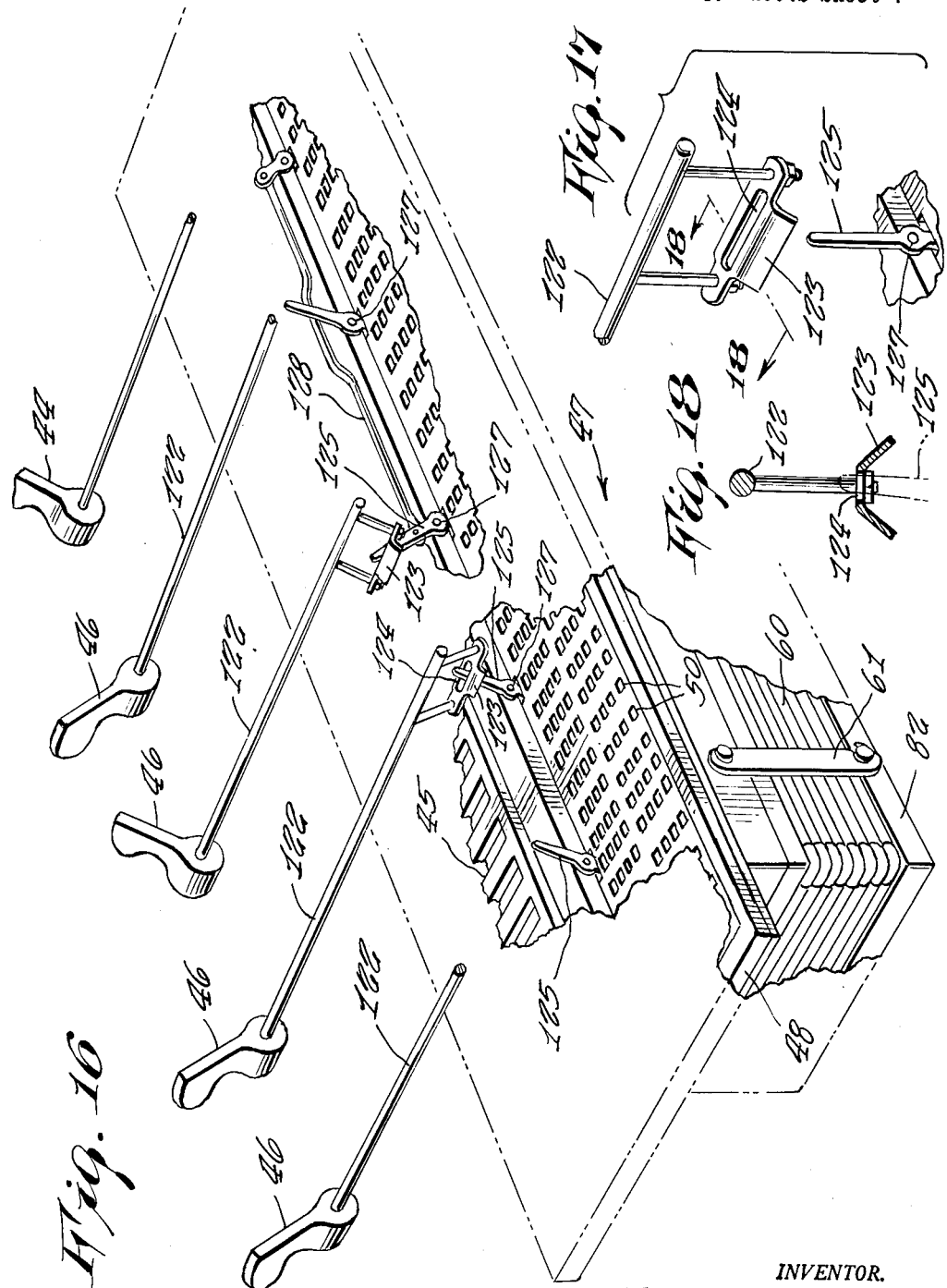

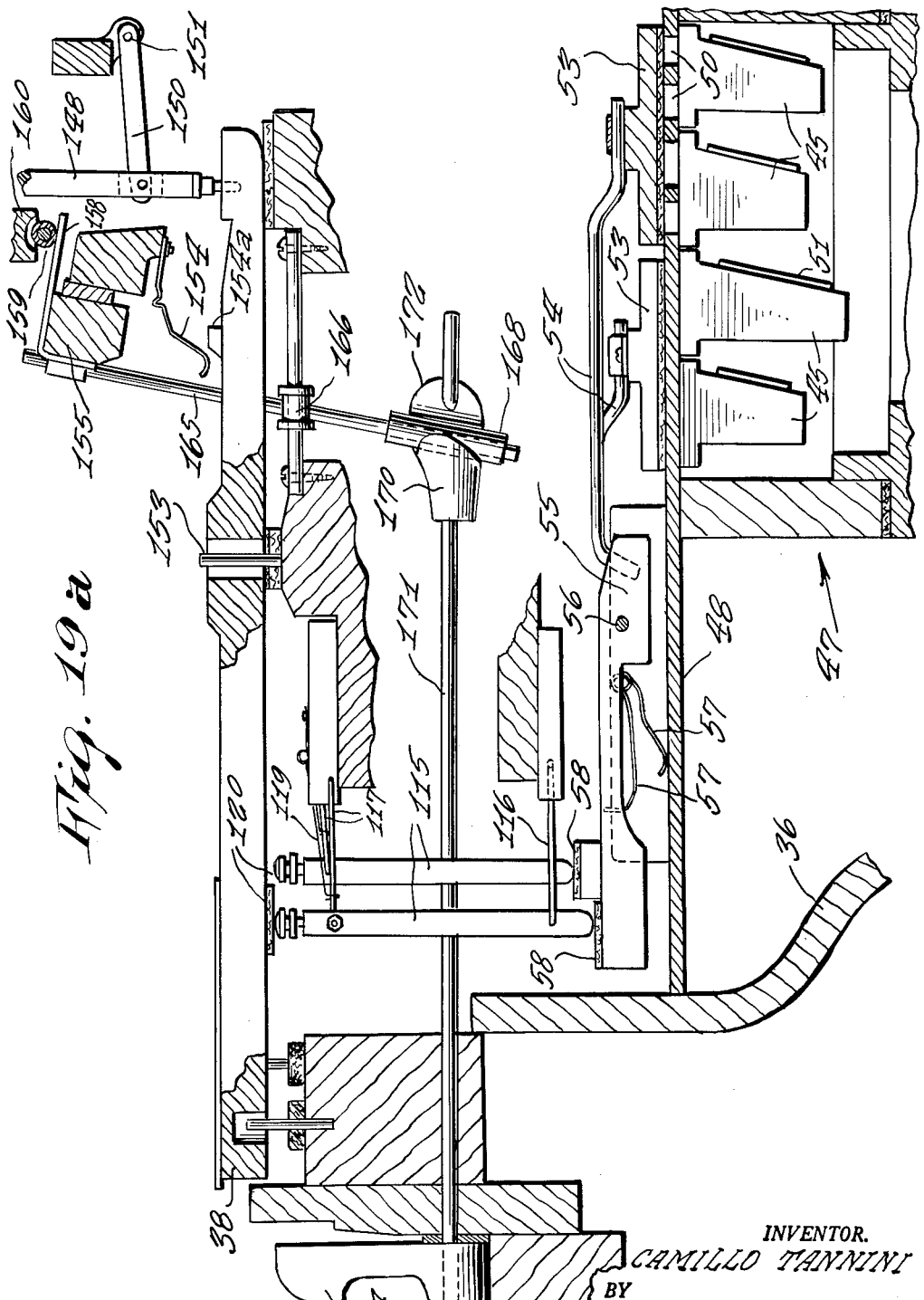

Aug. 21, 1962 C. TANNINI 3,049,960
COMBINED PIANO AND ACCORDION INSTRUMENT
Filed July 30, 1959 15 Sheets-Sheet 9
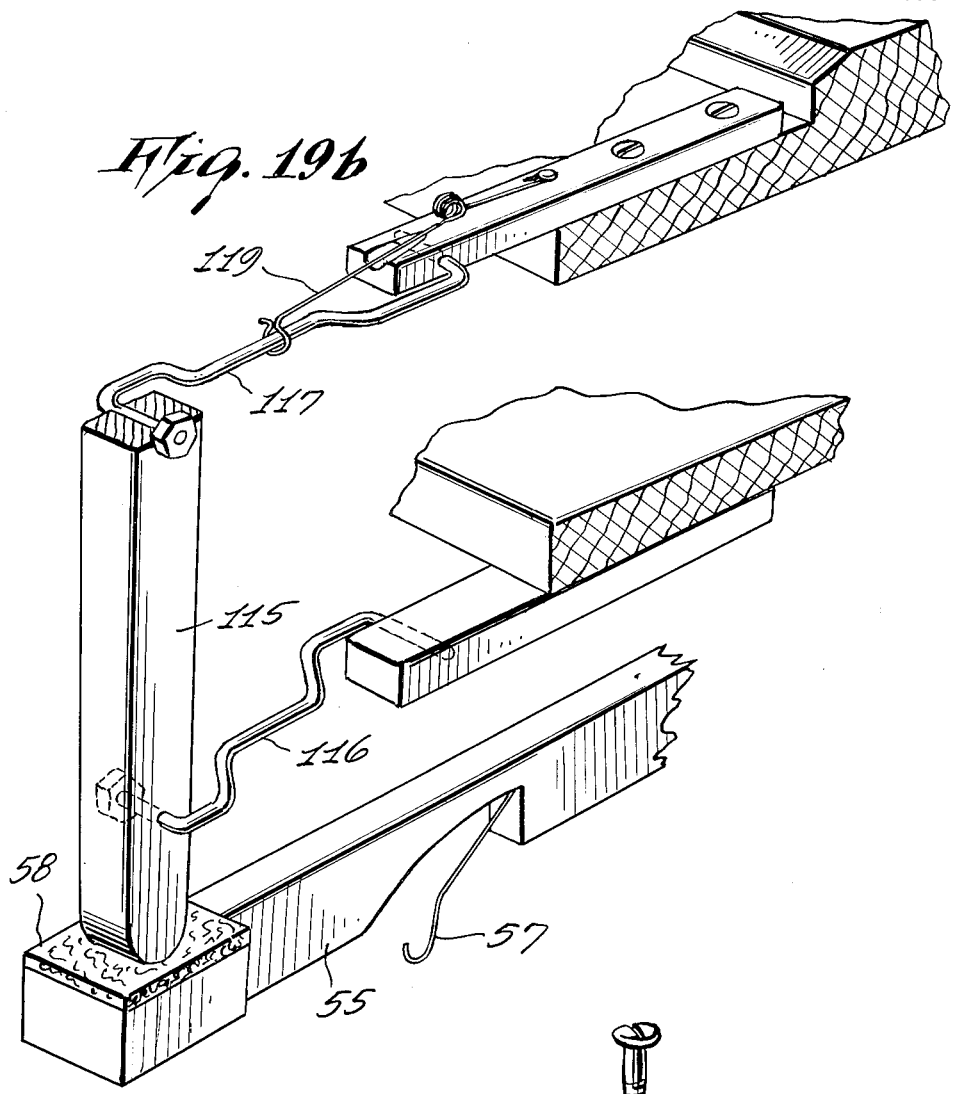
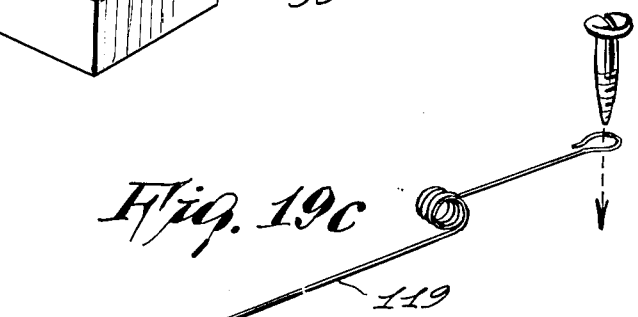
INVENTOR.
CAMILLO TANNINI
BY
Carl Miller
ATTORNEY Aug. 21, 1962 C. TANNINI 3,049,960
COMBINED PIANO AND ACCORDION INSTRUMENT
Filed July 30, 1959 15 Sheets-Sheet 10
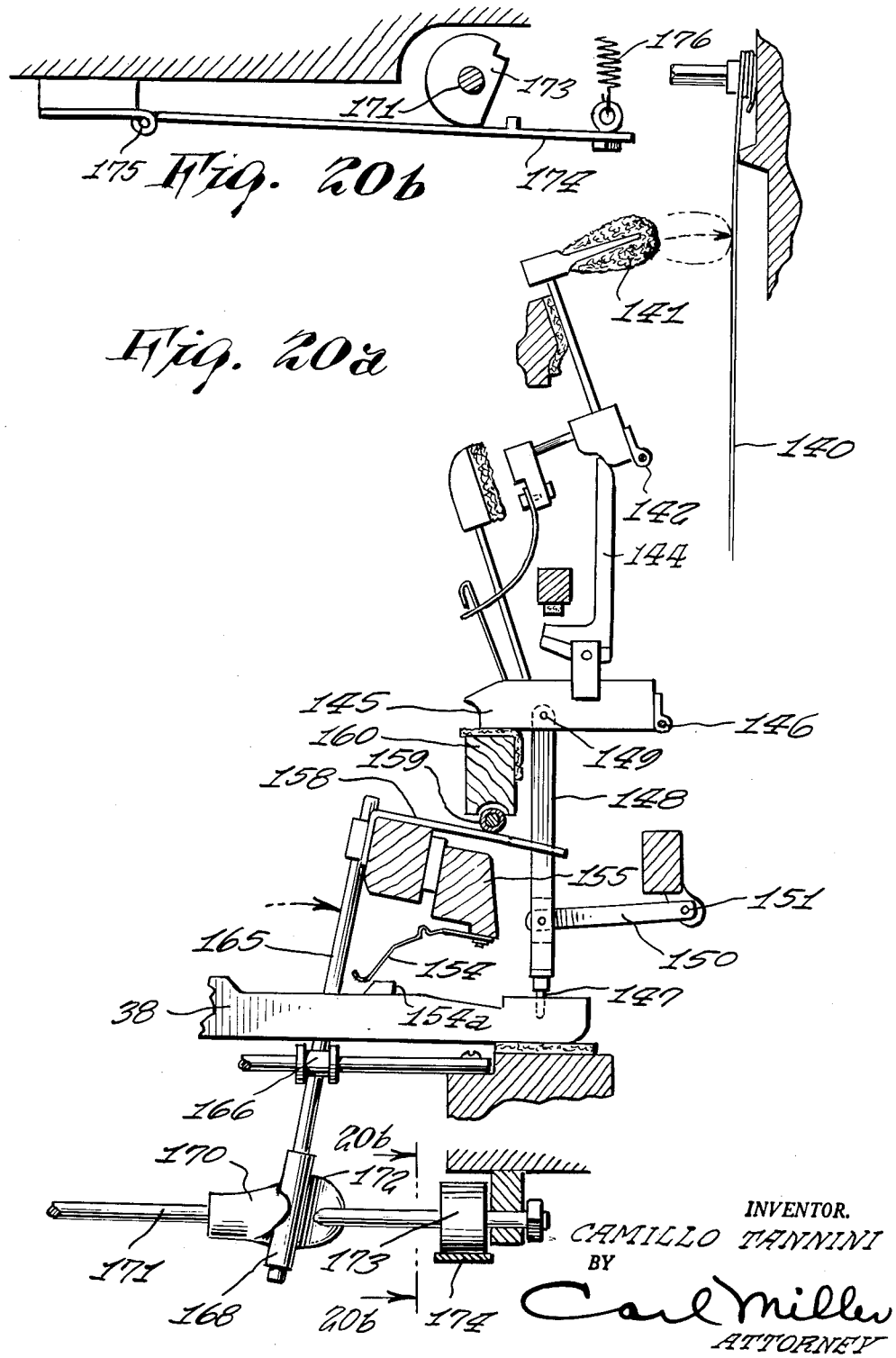
INVENTOR.
CAMILLO TANNINI
BY
Carl Miller
ATTORNEY

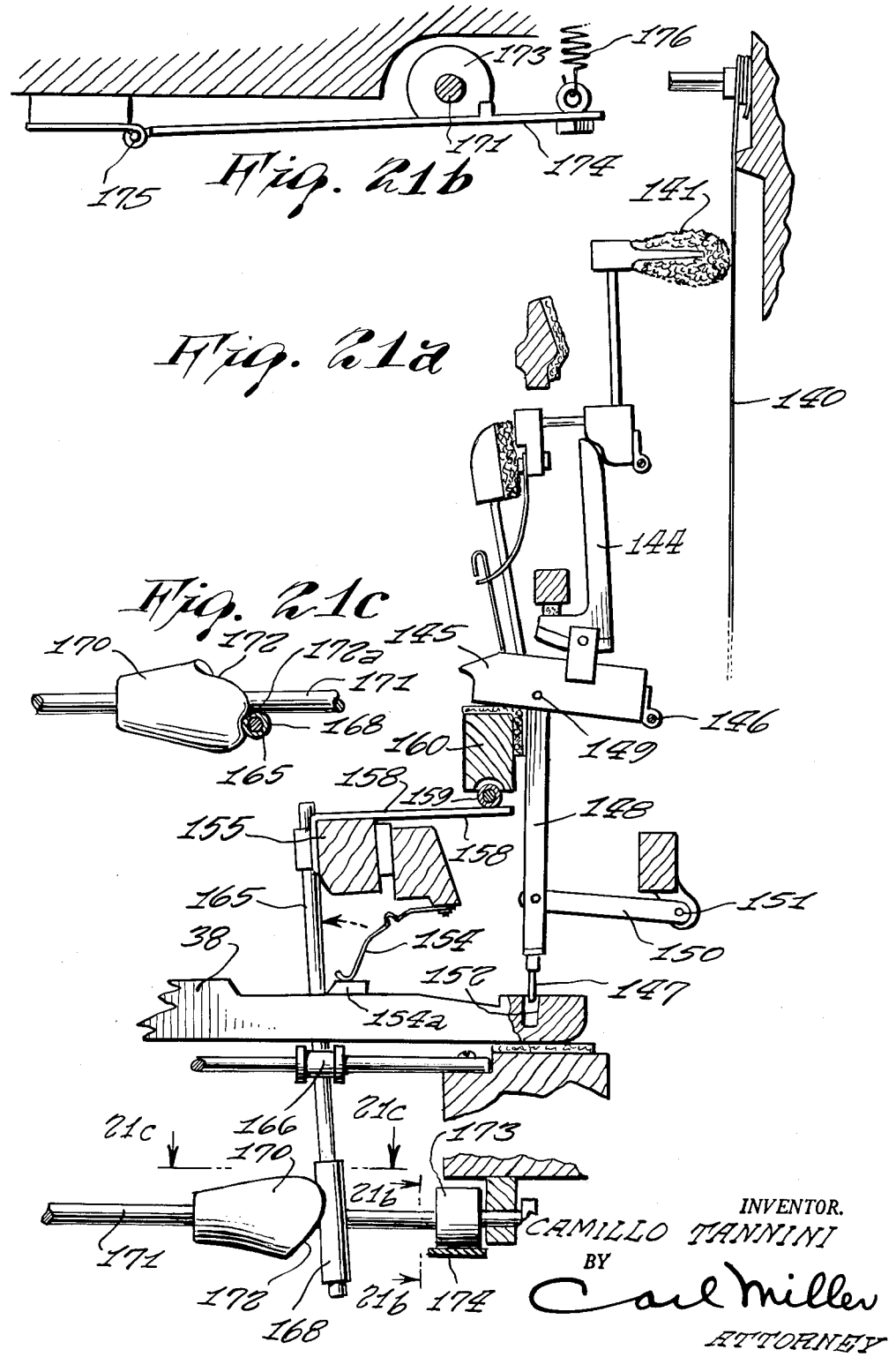

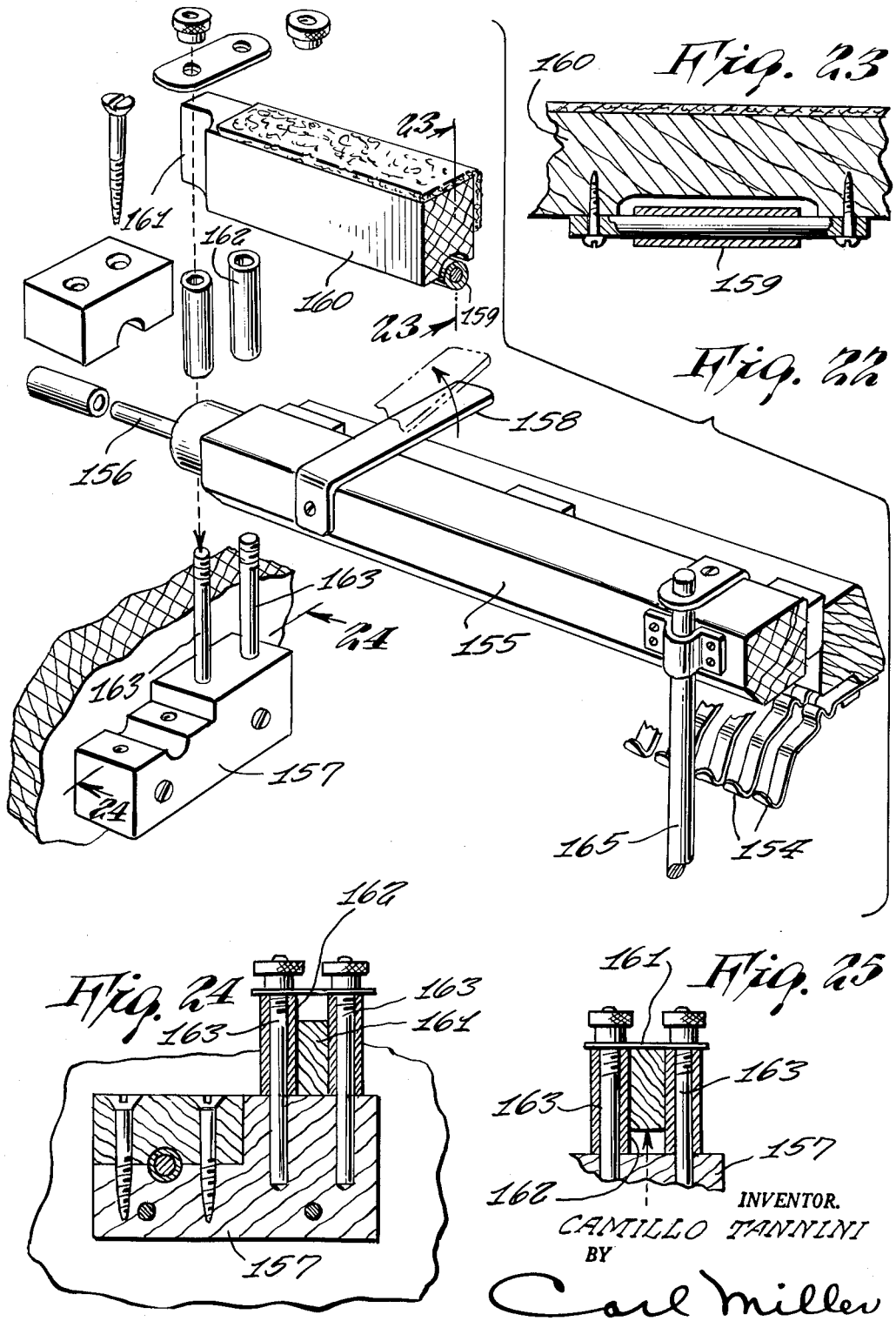

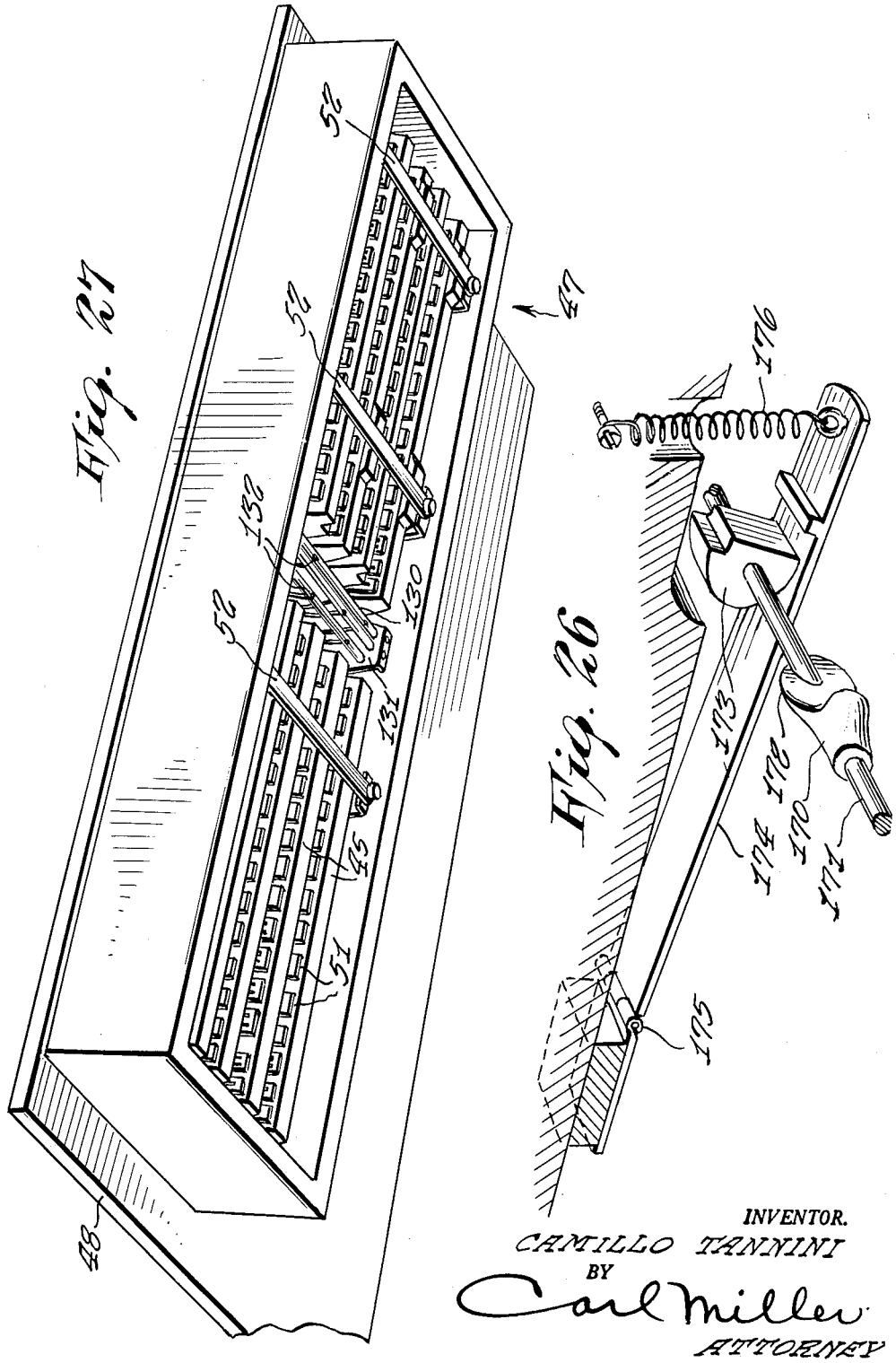

Aug. 21, 1962     C. TANNINI     3,049,960
COMBINED PIANO AND ACCORDION INSTRUMENT
Filed July 30, 1959     15 Sheets-Sheet 14

INVENTOR.
CAMILLO TANNINI
BY
Carl Miller
ATTORNEY

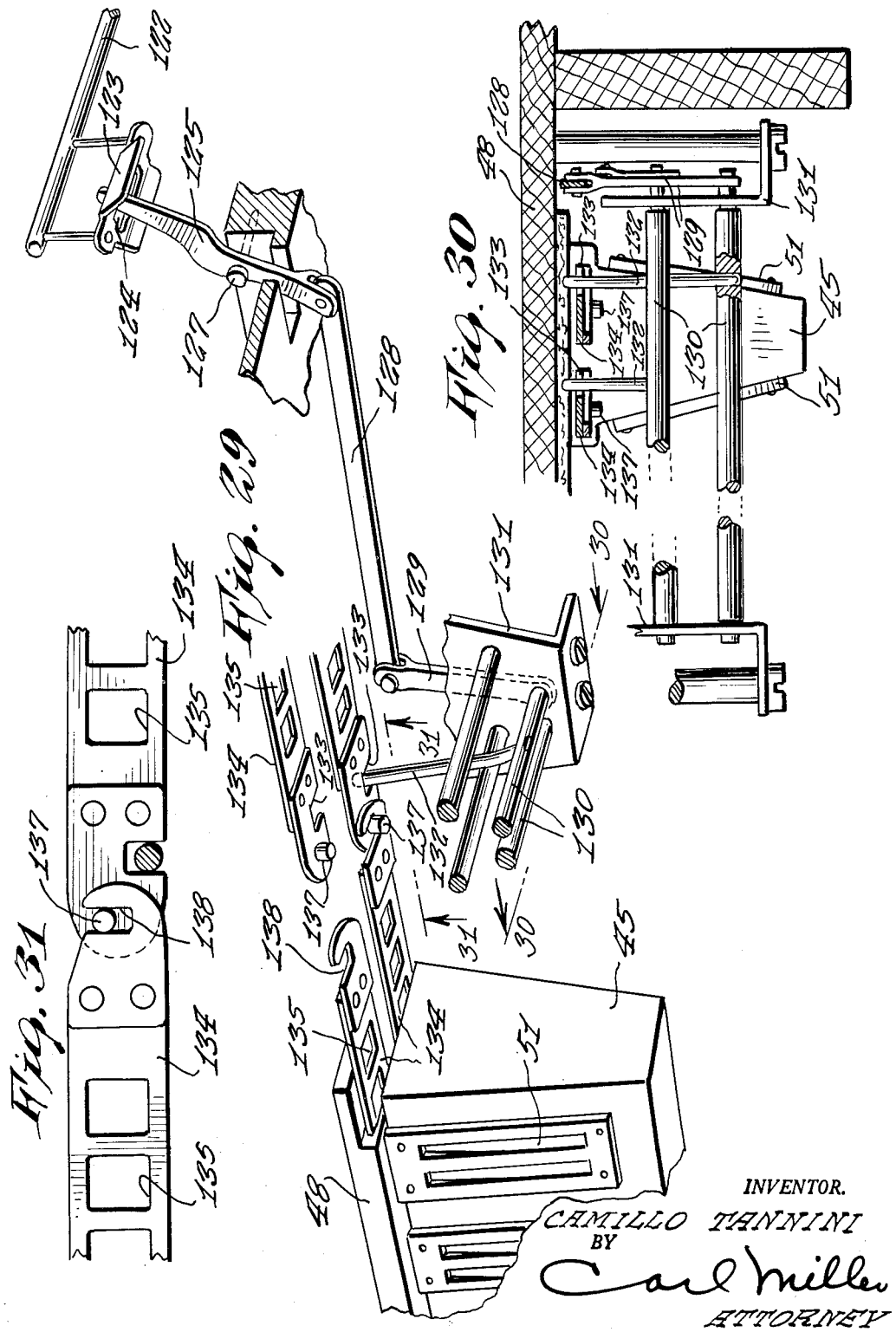

United States Patent Office 3,049,960
Patented Aug. 21, 1962

3,049,960
COMBINED PIANO AND ACCORDION
INSTRUMENT
Camillo Tannini, 29 Carmine St., 2nd floor,
New York, N.Y.
Filed July 30, 1959, Ser. No. 830,618
6 Claims. (Cl. 84—172)

This invention relates to musical instruments and, more particularly, to a combination musical instrument.

While a piano is a string instrument and an accordion is a wind instrument, both are played in substantially the same manner in that both require the use of a keyboard for selecting and playing various notes. It is therefore an object of the present invention to provide a musical instrument embodying the characteristics of both a piano and an accordion which will enable the music played thereby to selectively have the qualities of piano and/or accordion music.

Another object of the present invention is to provide a musical instrument having a set of strings, individual strikers for each one of the strings, reed bars having tuned reeds tuned to each of the strings, and a keyboard for effecting the sounding of any one of the strings or reeds to provide either or both of piano and accordion music.

A further object of the present invention is to provide a musical instrument of the type described having manually adjustable means for varying the volume of sound emanating from the strings and the reeds to produce any desired combination of string and reed music.

Still an additional object of the present invention is to provide a source of air pressure for operating the reeds in response to the actuation of selected keys of the keyboard simultaneously with the striking of the strings of the instrument, to produce any desired variation between completely piano and completely accordion music.

Still another object of the present invention is to provide a musical instrument of this type having manually operated control means for adjusting the tone of the reed music, and a manually operated handle for adjusting the amount of striking force transmitted to the strikers of the strings in response to the actuation of the keyboard.

All of the foregoing and still further objects and advantages of this invention will become apparent from a study of the following specification, taken in connection with the accompanying drawing, wherein:

FIGURE 4 is an enlarged fragmentary cross sectional view taken along line 4—4 of FIGURE 1;

FIGURE 5 is an enlarged fragmentary side view, with parts broken away, of the bellows and reed unit shown in FIGURE 4;

FIGURE 6 is an enlarged perspective view of one of the reed control valves of the present invention;

FIGURE 7 is a fragmentary front perspective view of mounting brackets forming a part of the present invention;

FIGURE 8 is an enlarged transverse cross sectional view taken along line 8—8 of FIGURE 7;

FIGURE 9 is a transverse cross sectional view taken along line 9—9 of FIGURE 8;

FIGURE 10 is a longitudinal cross sectional view taken along line 10—10 of FIGURE 4;

FIGURE 11a is a fragmentary plan view of a bellows valve member forming a part of the present invention;

FIGURE 11b is an enlarged fragmentary perspective view of certain parts of the valve shown in FIGURE 11a;

FIGURE 11c is a fragmentary cross sectional view taken along line 11c—11c of FIGURE 11b with parts removed;

FIGURE 11d is a perspective view of a slide member forming a part of the structure shown in FIGURES 11b and 11c;

FIGURE 11e is a perspective view of a foot operated switch mechanism forming another part of the present invention;

FIGURE 11f is a fragmentary transverse cross sectional view taken along line 11f—11f of FIGURE 11e;

FIGURE 12 is a fragmentary perspective view of certain parts of the assembly shown in FIGURE 11a;

FIGURE 13 is an enlarged fragmentary cross sectional view taken along line 13—13 of FIGURE 10;

FIGURE 14 is a fragmentary perspective view of parts of a foot pedal assembly forming a part of the unit shown in FIGURE 11e;

FIGURE 15 is an enlarged fragmentary cross sectional view taken along line 15—15 of FIGURE 13;

FIGURE 16 is a fragmentary perspective view of the reed and bellows unit forming a part of the musical instrument;

FIGURE 17 is an exploded fragmentary perspective view of one of the tone control actuators forming a part of the assembly shown in FIGURE 16;

FIGURE 18 is a transverse cross sectional view taken along line 18—18 of FIGURE 17;

FIGURE 19a is an enlarged fragmentary cross sectional view taken along line 19—19 of FIGURE 1;

FIGURE 19b is an enlarged fragmentary perspective view of certain parts of the operating mechanism of the reed and bellows unit;

FIGURE 19c is an enlarged fragmentary perspective view of certain of the operating parts of the assembly shown in FIGURE 19b;

FIGURE 20a is a fragmentary cross sectional view of the lever system of a string striker forming a part of the present invention, with the cam operated adjustment parts shown in a selected position for enabling the striker to strike the piano string during the playing of the instrument;

FIGURE 20b is an enlarged fragmentary cross sectional view taken along line 20b—20b of FIGURE 20a;

FIGURE 21a is a view similar to FIGURE 20a showing the adjustment mechanism with the string striker in an inoperative position to prevent striking of the piano strings during the playing of the instrument;

FIGURE 21b is a view similar to FIGURE 20b, taken along line 21b—21b of FIGURE 21a, showing the adjustment parts in the position shown in FIGURE 21a;

FIGURE 21c is a fragmentary cross sectional view taken along line 21c—21c of FIGURE 21a;

FIGURE 22 is an exploded perspective view of certain parts of the string striker lever control system;

FIGURE 23 is an enlarged fragmentary cross sectional view taken along line 23—23 of FIGURE 22;

FIGURE 24 is an enlarged cross sectional view taken along line 24—24 of the assembled structure of FIGURE 22, showing the lift bar for deactivating the piano string strikers in a released position;

FIGURE 25 is a view similar to FIGURE 24, showing the lift bar in a raised position for deactivating the piano string strikers;

FIGURE 26 is a perspective view of a detent and cam elements shown in FIGURES 20b and 21b, which retains the adjustment in any selected adjusted position;

FIGURE 2 is a bottom perspective view of a set of reed bars forming a part of the present invention;

FIGURE 29 is an enlarged perspective view, with parts broken away, of other parts of the tone control units shown in FIGURE 28;

FIGURE 30 is an enlarged fragmentary cross sectional view taken along line 30—30 of FIGURE 29; and FIGURE 31 is an enlarged fragmentary cross sectional view taken along line 31—31 of FIGURE 29.

Figure 1:
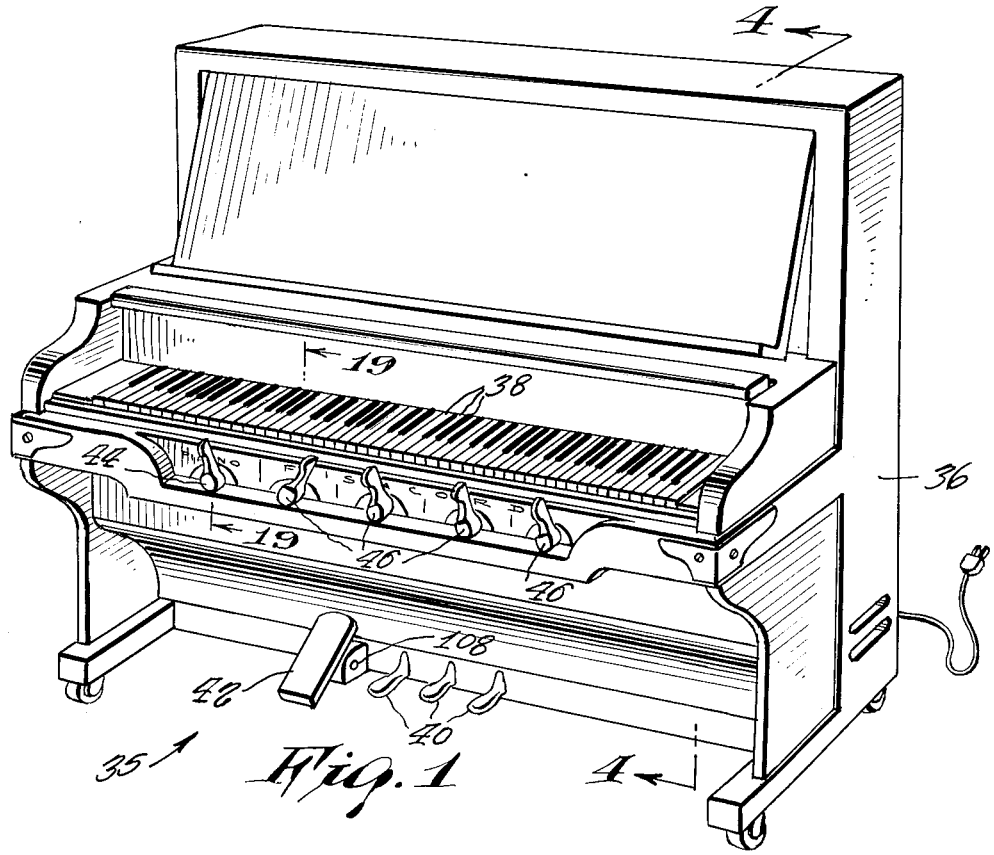
FIGURE 1 is a front perspective view of a musical instrument made in accordance with the present invention.

Referring now to the drawing, a musical instrument 35 made in accordance with the present invention is shown to include a case 36 having a key board with keys 38 in the front thereof. A set of foot pedals 40 are also provided for controlling the piano playing characteristics thereof, in a conventional manner. An additional control pedal 42 is also provided for adjusting the volume of the accordion playing characteristics of the musical instrument. A selector handle 44 mounted adjacent to the key board may be manually adjusted for varying the playing characteristics of the musical instrument to include either or both of the piano and accordion effects. Additional manually operated handles 46 are also provided adjacent to the keyboard for varying the tone of the accordion sounds, all as will be hereinafter more fully described.

As is more clearly shown in FIGURES 4, 10, 27, and 28, an accordion reed and bellows unit 47 forming a part of the present invention includes a main panel 48 which is detachably supported upon a pair of rails 49 carried by the casing, in a manner hereinafter more fully explained. The panel 48 supports a plurality of valve bars 45, each of which has a plurality of selected reeds 51, each one of which is capable of reproducing a note corresponding to the note reproduced by a corresponding one of the strings 140 of the piano unit. The panel 48 is also provided with air ports or air inlet openings 50 that communicate with each one of the reeds of the valve bars 45. Tie bars 52 detachably secure the valve bars 45 in place beneath the panel 48 in communication with the air openings 50. With reference to FIGURE 6 of the drawing, it will be noted that an individual stopper or valve control pad 53 is adjustably supported upon the end of an arm 54 forming a part of an actuator block 55 that is pivotally mounted by means of a hinge pin 56 to the top of the main panel 48. One such stopper 53 and mounting block 55 is provided for each set of ports 50 and reed 51 of the accordion unit. Springs 57 normally maintain the stoppers 53 in closed engagement with the ports 50, whereas a downward movement upon the pressure pads 58 at the opposite ends of the mounting blocks 55, as will be hereinafter described, is operative to open the selected ports 50 to permit the passage of air therethrough.

A bellows unit 60 is supported upon a set of hangers 61 beneath the reed bars 45, as is clearly shown in FIGURES 4, 5, and 10 of the drawing. A flexible air line 63 communicating at one end with the interior of the bellows 60 through the bottom panel 82 of the assembly, is connected at its opposite end to an air supply unit 64 that includes an electrically driven motor 65 and air pump 66. The one end of the flexible conduit 63 projecting into the bellows 60 defines a valve seat 68 with which a valve member 69 supported upon a valve bar 95 cooperates. The valve bar 95 is hingedly mounted by means of a hinge 70 upon the inner surface of the bottom panel 82 of the unit to enable the valve member 69 to move between a blocking and an open position with the end of the conduit 63. A safety check valve 72 also carried by the bottom panel 82 is normally in a closed position, but is movable toward an open position in response to a build up of a predetermined quantity of pressure within the bellows, to thus prevent damage to the working parts by an excess pressure therewithin.

With reference now to FIGURES 10 through 15 of the drawing, a foot pedal unit 73 for controlling both the amount of air supplied to the interior of the bellows 60 and the actuation of a plunger 74 of an electrical switch 75 for energizing the fan motor 65, is shown to include a push rod 71 having one end 89 mounted upon an inner extension 92 of the foot pedal 42. The upper end of the push rod 71 is rotatably mounted within an internally threaded adjustment sleeve 93 which threadedly receives a threaded stud portion 94 of a vertical slide member 84. This slide member 84 extends through the bottom panel 82 of the bellows and is slidably received within a stationary sleeve 83 having vertical guide slots 86 on opposite sides. A transversely extending pin 85 integral with the slide member 84 is slidably received within the slots 86 of the sleeve 83, which pins 85 follow the vertical movement of the push rod 71 in response to actuation of the foot pedal 42. Thus, as the foot pedal 42 is actuated, the lower end 89 of the push rod 71 that is loosely fitted within a larger opening 90 of the inner extension 92 of the foot pedal is free to move the slide 84 vertically within the fixed sleeve 83. The forward free end of the valve bar 95 resting upon a cross bar 96 of a bracket 97 that is pivotally mounted upon stationary mounting pins 98, thus follows the movement of a pair of bifurcated arms 100 that project forwardly from the back 97 and rest upon the transverse pins 85 of the slide member 84. A tension coil spring 99 secured at opposite ends to mounting posts carried by the bottom panel 82 yieldably urge the valve bar 95 downwardly, with the valve member 69 being urged toward a normally valve closed position with respect to the valve seat 68 of the conduit 63. However, as the foot pedal 42 is depressed, the inner extension 92 thereof is raised, thus allowing the push rod 71 to raise the bracket 97 through the pins 85 to lift the valve member 69 out of sealed engagement with the valve seat 68, thus permitting a controlled quantity of air to enter into the interior of the bellows for operating the reeds of the valve bars 45, as will be hereinafter more fully described.

Referring to FIGURES 7 to 9 of the drawing, it will be noted that the reed and bellows unit 47 is detachably mounted upon a pair of longitudinally spaced apart and laterally extending rails 49 which have longitudinal slots 76 into which the bushings 78 of the mounting rods 77 project. A pair of brackets 79 secured to each longitudinal extremity of the casing 36 threadedly support the vertically extending mounting rods 77 to which the bushings 78 are rotatably secured for accommodating horizontal sliding movement of the rails 49. Thus, the opposite ends of the upper bellows panel 48 are carried directly upon the rails 49 for sliding movement with the rails along the length of the slots 76 and for vertically raising and lowering the unit during the mounting and removal of the reed and bellows unit 47 within the casing 36. This arrangement facilitates the installation, removal, and maintenance operations required upon the working parts of the reed and bellows assembly.

Figure 3:
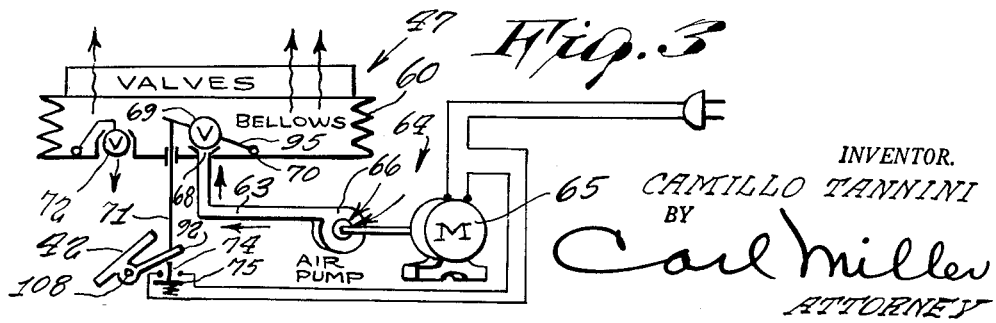
FIGURE 3 is a schematic diagram of the electrical and pneumatic control system of the musical instrument.
Figure 28:
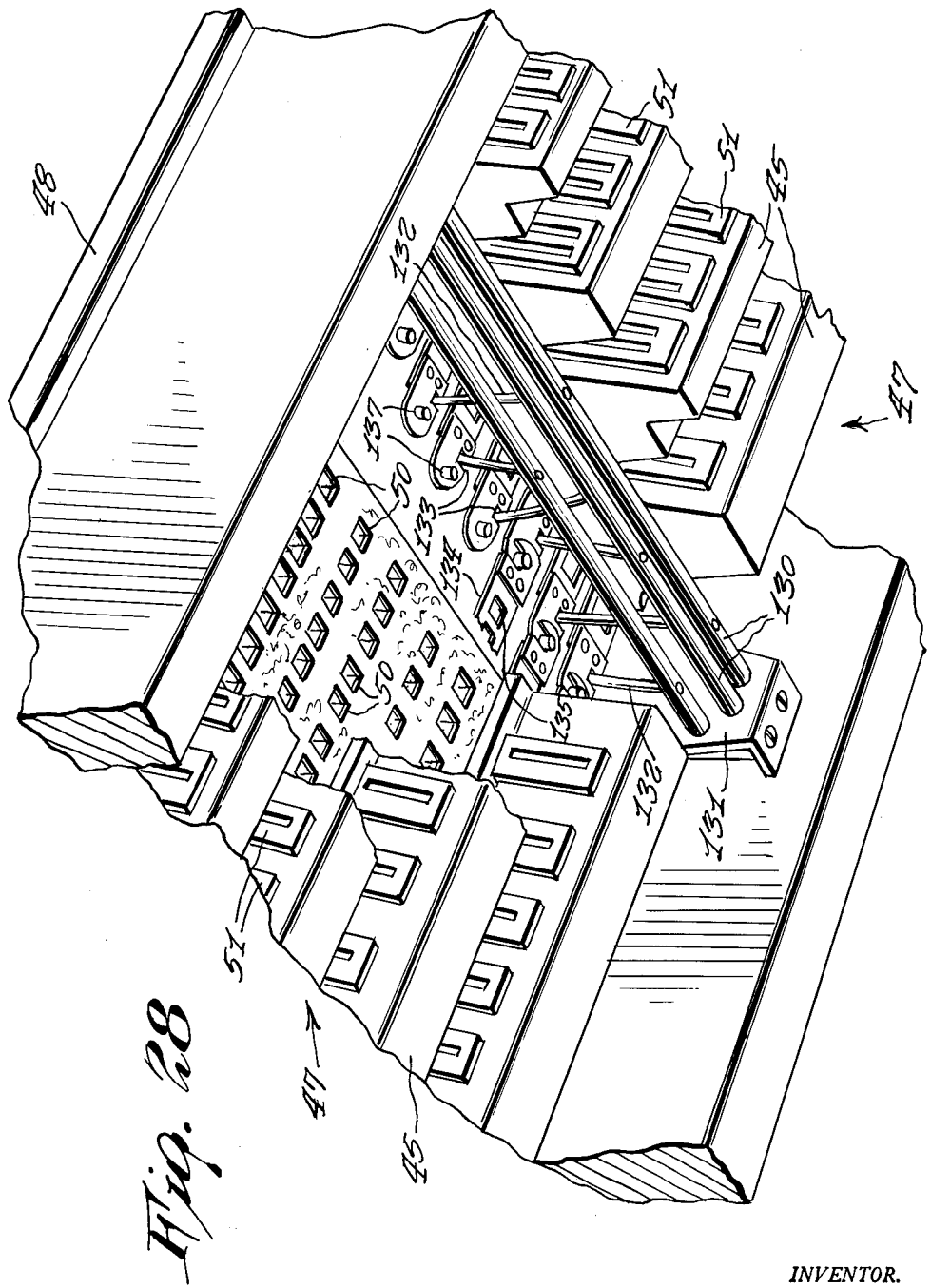
FIGURE 28 is an enlarged fragmentary bottom perspective view of certain parts of the set of reed bars shown in FIGURE 27, showing the tone control elements forming a part of the present invention.

Referring again to FIGURES 11 to 14, it will be noted that a base 102 adjacent to the foot pedal 42 is provided with a pair of spaced apart parallel arms 103 that are pivotally mounted upon pins 105. The free ends of the arms 103 support a crossbar 104 that overlies the innermost extremity of the extension 92 of the foot pedal 42. A spring 106 acting between one of the arms 103 and the base 102 normally urges the inner extremity 92 of the foot pedal downwardly, thus yieldably resisting downward movement of the foot pedal 42 on the outside of the casing 36. However, as the foot pedal 42 is depressed and rotated about the supporting pivot pin 108, the upward movement of the push rod 71 is operative to open the valve member 69 of the valve bar 95 to allow air to enter into the interior of the bellows 60 through the valve seat 68. Simultaneously, the push button 74 of the switch 75 is also allowed to move upwardly to close the electrical circuit through the motor 65, as shown in FIGURE 3, to actuate the air pump 66 to supply air under pressure into the interior of the bellows through the open valve seat 68. Of course, the further the foot pedal 42 is depressed, the greater amount of air will be permitted to enter into the interior of the bellows 60, thus increasing the volume of the sound produced by the air passing through the reeds 51 of those valve bars 45 in which the air openings 50 have been opened by actuation of the keys 38 of the key board. A bearing plate 113 acting between an adjustment bolt 111 and adjustment nut 112 of a laterally extending switch plate 110 carried by the arms 103, and the plunger 74 of the switch 75, provides for the smooth operation of the switch.

With reference to FIGURES 19a, b, c, the operation of the air stoppers 53 of the reed and bellows unit 47 will be more readily understood. A separate actuator rod 115 is provided for operating bar 55 of each reed 51. These actuator rods 115 are supported upon upper and lower rods 117, 116, respectively, for parallel vertical movement in response to a downward pressure transmitted to the upper extremity of adjustment pads 120 of the actuator rods 115 by each key 38 of the key board. Torsion springs 119 secured at one end to a stationary part, underlie the upper support rods 117 at their opposite ends to normally urge the actuator rods 115 toward an elevated position, thus relieving the downward pressure upon the pads 58 of the mounting blocks 55 which carry the stoppers 53 and are urged toward a closing position by means of the springs 57. By adjusting the adjustment pads 120 of the push rods 115, the desired sensitivity may be obtained.

Reference is now made to FIGURES 16 to 18, and 28 to 31 of the drawing, which show the operation of the tone control system of the reed and bellows unit 47. A tone control rod 122 is mounted at one end upon each one of the tone control handles 46, the opposite end of which is provided with a radially outwardly extending cage 123 having a longitudinal slot 124. The slot 124 of each cage 123 pivotally receives one extremity of a rocker lever 125 that is pivotally mounted by means of a pin 127 to a stationary part of the upper panel 48. Links 128 connect the innermost extremity of each such lever 125 to a respective crank arm 129 of control cross rods 130. These cross rods 130 are rotatably supported upon a pair of brackets 131 carried by the upper panel 48, and each such cross rod is provided with one or more radially outwardly extending actuating pins 132 that are received within slots 133 of tone slides 134. These tone slides 134 have apertures 135 corresponding to one of the apertures 50 of each set of ports for each reed 51. It will thus be recognized that by shutting off one or more of the apertures 50 of each set of reed ports will alter the tone of the note sounded by the passage of air through the reeds 51.

Because of space restrictions within the casing 36, the valve bars 45 are spaced in laterally disposed side by side relationship, as well as in longitudinally spaced apart relationship, rather than in only longitudinally spaced apart relationship as are the strings 140 of the piano unit. Accordingly, with the control rods 130 mounted centrally of the reed and bellows unit, a plurality of the tone slides 134 are connected together by means of co-operating pins 137 and slots 138 to allow for the adjustment of certain ones of the valve ports during actuation of the correspondingly connected adjustment handles 46.

With reference now to FIGURES 20 through 25 of the drawing, the mechanism for individually striking each of the strings 140 of the piano unit is shown to include a separate striker 141 for each such string, as is provided in conventional pianos. Each striker 141 is pivotally mounted upon a pivot pin 142 for selective movement toward striking engagement with the string 140 in response to driving movement of the striker lever 144 of a lift bar 145 similarly pivoted upon a pin 146. A striker rod 148 pivotally mounted upon a pin 149 at one end to the lift bar 145 is in abutment with the innermost end of the respective key 38 of the key board. A guide link 150 pivotally mounted at one end upon a fixed pivot pin 151 guides the striker rod 148 for vertical movement in response to a downward pressure upon the outermost free end of the key 38, thus raising the lift bar 145 sufficiently to drive the striker lever 144 thereof forwardly into engagement with the striker 141 which is thus thrown forwardly into abutting striking engagement with the string 140, to produce a sound. It will thus be recognized that with the parts in the position shown in FIGURE 20a, a downward pressure upon the outermost end of the key 38 will cause the striker 141 to be thrown forwardly into striking engagement with the string 140. However, by adjusting the position of certain parts of this mechanism, the string strikers 141 may be inactivated to prevent sounding of the strings 140.

A cross bar 155 having bearing pins 156 at opposite longitudinal extremities is rotatably supported upon the casing 36 for rotation about the longitudinal axis of the bearing pins 156 that are carried upon bearing blocks 157. The cross bar 155 is provided with a depending leaf spring 154 for each key 38 of the key board to thus yieldably resist upward movement of the innermost end thereof, in a manner well known to those skilled in the art. However, in response to a downward movement of the outermost end of the key 38, such key is pivoted slightly about its central mounting pin 153 to raise the innermost end thereof against the action of the spring 154 to impel the striker rod 148 upwardly in the manner hereinbefore described. The cross bar 155 is also provided with a quantity of longitudinally spaced apart angle bars 158 that underlie and slidably engage with rollers 159 rollably carried upon a transversely extending lock bar 160. This lock bar 160 is provided with end rails 161 that are slidably received within a guideway 162 formed by parallel pins 163 carried by each of the bearing blocks 157, one such bearing block being shown in the drawing. Thus, in response to rocking movement of the cross bar 155 upon its bearing pins 156, from the position shown in FIGURE 20a, to the position shown in FIGURE 21a, angle bars 158 elevate the lock bar 160 to tilt all of the lift bars 145 sufficiently to enable the toe-striker levers 144 thereof to move the string strikers 141 gently into abutment with the strings 140. This movement also raises the feeler pins 147 sufficiently far enough out of the sockets 152 at the innermost ends of the keys 38 to prevent actuation of the striker rods 148 in response to actuation of the respective keys 38. The rocking movement of the cross bar 155 is also sufficient to disengage the key springs 154, by riding over the small step of 154a thus completely freeing the keys 38 from association with the string striking mechanisms of the unit. Thus, any downward movement of the keys 38 is transmitted solely to the push rods 115 which operate the stoppers 53 of the reed bars in the manner hereinbefore described, to produce only an accordion effect.

The rocking movement of the cross bar 155 is controlled by means of the adjustment handle 44 which is fixed to a selector shaft 171 that extends in a direction transversely of the cross bar 155. A cam 170 fixed to the selector shaft 171 has a cam surface 172 which may be rotated into engagement with a bearing roller 168, rotatably carried upon the lowermost end of a cantilever that is secured at its uppermost end to the cross bar 155. A mid section of the cantilever 165 is guided by a guide roller 166. Thus, by rotating the handle 44, the cam 170 may be rotated from the position shown in FIGURE 20a, in which the strings 140 may be struck in response to a downward movement of the keys 38, to the position shown in FIGURE 21a in which the cross bar 155 is rocked sufficiently to prevent the downward movement of the keys 38 from causing the strings 40 to be struck. While the handle 44 may be adjusted between the opposite extremities of movement thereof to provide for any combination of piano and/or accordion music, a detent 172a in the cam surface 172, as shown in FIGURE 21c, enables the string striking mechanism to be locked in the fully inoperative position shown in FIGURE 21a. All intermediate positions of the handle 44 are retained by a friction block 173 secured to the innermost end of the selector shaft 171 that acts upon a friction plate 174 pivotally mounted to the casing 36 by means of a hinge 175. A tension spring 176 acting between the casing and the plate 174 exerts sufficient pressure upon the block 173 to releasably retain it in any rotated position, thus securing the string striking mechanism in any adjusted position.

Figure 2:
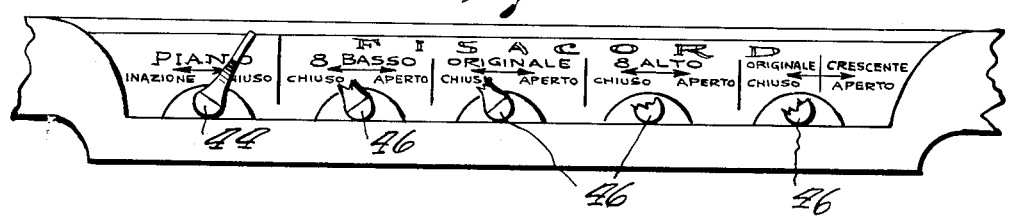
FIGURE 2 is an enlarged front plan view of the control panel of the musical instrument.

The operation of this musical instrument will now be readily understood. In the absence of a source of pressurized air, such as when the motor 65 is not connected to a source of electrical energy, the instrument may be played as a piano in a conventional manner. However, by connecting the motor 65 of the air supply unit to a suitable source of electrical energy, and with the control handle 44 rotated as far as possible to the left in FIGURE 2, it is still possible to play the instrument to produce solely a piano sound simply by not activating the foot pedal 42. However, in any position of the control handle 44, an accordion tone may be had simply by depressing the foot pedal 42 as the keys 38 are played, thus energizing the motor 65 and allowing air to enter the interior of the bellows 60 to sound the reeds 51 of those keys 38 depressed. The volume of the accordion music may be increased simply by depressing the foot pedal 42 to a greater extent. Since the keys 38 may actuate both the string strikers and the reed stoppers, it is also possible to produce a combination of piano and accordion music in varying proportions simply by adjusting the positions of the control handle 44 and the foot pedal 42. The tone of the accordion music may be adjusted by the tone control handles 46, to produce various effects and sounds.

While this invention has been described with particular reference to the construction shown in the drawing, it is to be understood that such is not to be construed as imparting limitations upon the invention, which is best defined by the claims appended hereto.

What I claim as new and desire to protect by Letters Patent of the United States is:

1. A musical instrument comprising, in combination, a set of strings, individual strikers for each of said strings, a set of reed means including a mounting panel, a plurality of reed bars mounted upon said panel, a plurality of tuned reeds mounted on said reed bars, air ports in said mounting panel in communication with each of said reed bars, a housing defining an air chamber around said reed bars on one side of said panel, individual air stoppers controlling passage of air through said air ports, pressure means comprising a conduit connected to said housing, a pump connected to said conduit, an electric motor connected to said pump, circuit means including a switch connected to said motor, a foot pedal connected to said switch for operating said switch, a valve in said conduit controlling the flow of air to said housing from said pump, a connecting rod extending between said valve and said foot pedal controlling the opening of said valve, and a pressure relief valve within said housing limiting the build-up of the pressure therewithin.

2. A musical instrument comprising, in combination, a set of strings, individual strikers for each of said strings, a set of reed means including a mounting panel, a plurality of reed bars mounted upon said panel, a plurality of tuned reeds mounted on said reed bars, each one of said reeds being tuned to a corresponding one of said strings, air ports in said mounting panel in communication with each of said reed bars, a housing defining an air chamber around said reed bars on one side of said panel, individual air stoppers controlling passage of air through said air ports, pressure means comprising a conduit connected to said housing, a pump connected to said conduit, an electric motor connected to said pump, circuit means including a switch connected to said motor, a foot pedal connected to said switch for operating said switch, a valve in said conduit controlling the flow of air to said housing from said pump, a connected rod extending between said valve and said foot pedal controlling the opening of said valve, and a pressure relief valve within said housing limiting the build-up of the pressure therewithin.

3. A musical instrument as set forth in claim 1, and a plurality of keys, an actuating means including a link system drivingly connecting each one of said keys to one of said strikers, and a lever connected between each said key and one of said stoppers, whereby movement of each said key is operative to simultaneously actuate said link system and lever associated therewith.

4. A musical instrument as set forth in claim 2, and a plurality of keys, an actuating means including a link system drivingly connecting each one of said keys to one of said strikers, and a lever connected between each said key and one of said stoppers, whereby movement of each said key is operative to simultaneously actuate said link system and lever associated therewith.

5. A musical instrument as set forth in claim 2, and a bellows connecting said conduit to said housing, and a check valve within said bellows for limiting the build up of air pressure therewithin.

6. A musical instrument as set forth in claim 5, and a plurality of keys, an actuating means including a link system drivingly connecting each one of said keys to one of said strikers, and a lever connected between each said key and one of said stoppers, whereby movement of each said key is operative to simultaneously actuate said link system and lever associated therewith.

References Cited in the file of this patent

UNITED STATES PATENTS

| 505,235 | Schuhlein | Sept. 19, 1893 |
| 1,144,512 | Traversaro | June 29, 1915 |
| 1,191,161 | Day et al. | July 18, 1916 |
| 1,237,057 | Klein | Aug. 14, 1917 |
| 1,256,487 | Marsh | Feb. 12, 1918 |

FOREIGN PATENTS

| 17,875 | Great Britain | Nov. 6, 1890 |
| 63,699 | Germany | Aug. 9, 1892 |